United States Patent [19]
Linden

[11] Patent Number: 5,665,026
[45] Date of Patent: Sep. 9, 1997

[54] METHOD AND APPARATUS FOR LIMITING THE SPEED OF A MOTOR VEHICLE

[75] Inventor: Thomas Linden, Stuttgart, Germany

[73] Assignee: Mercedes-Benz AG, Stuttgart, Germany

[21] Appl. No.: 616,000

[22] Filed: Mar. 18, 1996

[30] Foreign Application Priority Data

Mar. 16, 1995 [DE] Germany .......... 195 09 492.1

[51] Int. Cl.$^6$ .......... B60K 31/00; B60K 26/00; F16H 59/36
[52] U.S. Cl. .......... 477/108; 180/170
[58] Field of Search .......... 477/107, 108, 477/120; 180/170

[56] References Cited

U.S. PATENT DOCUMENTS

| | | |
|---|---|---|
| 4,252,096 | 2/1981 | Kennedy . |
| 4,538,571 | 9/1985 | Buck et al. .......... 180/170 |
| 4,747,051 | 5/1988 | Hall et al. .......... 180/170 |

FOREIGN PATENT DOCUMENTS

| | | |
|---|---|---|
| 28 36 342 | 2/1980 | Germany . |
| 29 25 566 | 1/1981 | Germany . |
| 33 29 783 | 2/1985 | Germany . |
| 34 05 707 | 8/1985 | Germany . |
| 35 10 174 | 9/1986 | Germany . |
| 36 18 844 | 12/1987 | Germany . |
| 37 03 645 | 8/1988 | Germany . |
| 41 15 903 | 11/1991 | Germany . |
| 44 17 593 | 11/1994 | Germany . |

OTHER PUBLICATIONS

*MTZ Motortechnische Zeitschrift*, 46 (1985) 4, entitled "An Electronic Engine–Control System for Motor Vehicles" by Gerhard Kolberg, pp. 129–133.

*Primary Examiner*—Dirk Wright
*Attorney, Agent, or Firm*—Evenson, McKeown, Edwards & Lenahan, P.L.L.C.

[57] ABSTRACT

Method and apparatus are provided for limiting the speed of a motor vehicle. The method intervenes to limit the engine torque while the actual speed is still below the maximum speed, but yet a demand by the driver for a speed above the maximum speed is detected. In this case, an acceleration-regulating system intervention takes place first and, if the speed further approaches the maximum speed, a speed-regulating system intervention takes place, allowing the actual speed to be brought gently to the set maximum speed. In the case of speeds demanded by the driver which are below the maximum speed, the driving response remains determined solely by the driver. It is advantageous to combine the speed limitation with cruise control, with selective activation of one of the two operating modes.

12 Claims, 4 Drawing Sheets

METHOD AND APPARATUS FOR LIMITING THE SPEED OF A MOTOR VEHICLE

BACKGROUND AND SUMMARY OF THE INVENTION

The invention relates to a method and an apparatus for limiting the speed of a motor vehicle to an adjustable maximum speed which separates a lower speed range to be maintained from a higher speed range to be avoided.

It is known practice in the prior art to keep the speed of a motor vehicle to a particular value, once reached, by means of a "cruise control" system. To do this, the driver releases a cruise-controller operating lever when the desired value is reached, and thus activates the cruise control system, in the process defining the instantaneous speed value as the required value. A cruise control system of this type serves, above all, to relieve the burden on the driver on long journeys when he wishes to drive at a constant speed for a prolonged period, on sections of a motorway.

German Patent document DE 37 03 645 A1 describes, for example, a cruise control system of this type in which the speed is maintained by means of a PI controller with P and I components which can be switched on and off separately. The intention in the case of the system in the German Patent document is to achieve gentle control transitions in the event of changes in the required speed value by suitable choice of the P and/or I controller component and appropriate alteration of the control parameters.

The driving situation is different when a certain maximum speed is prescribed on a section of a road. Examples which are important in practice are the speed-restricted zones in residential areas with a maximum permissible speed of 30 km/h or in other suburban areas with a maximum speed of 50 km/h. Here, the driver should be able to drive at any speed lower than the maximum speed and only the exceeding of this maximum speed should be prevented. A cruise control system is not appropriate for this purpose since the activated cruise controller always attempts to set the required speed and, furthermore, switches off automatically when the brakes are actuated. Thereafter, it has to be reactivated by accelerating to the required speed. There is therefore a requirement for systems by which the vehicle speed can be limited to an adjustable maximum speed and which, at the same time, the systems allow the vehicle to be driven at any speed below this maximum speed.

German Patent document DE 33 29 783 A1 describes measures taken on the vehicle, such as an engine-power limitation, e.g. by restricting the fuel supply, which are performed under microprocessor control if the maximum speed is exceeded in order to automatically prevent driving above a prescribed maximum speed. In a very similar manner, provision is made in the case of a device for limiting the speed of motor vehicles in accordance with German Patent document DE 29 25 566 A1 to prevent a continuous infringement of the maximum speed by rendering ineffective a—possible relatively hard—actuation of the accelerator pedal by the driver in the event of an infringement. In both systems, the maximum speed can be adjusted, either from outside or by the driver.

German Patent document DE 28 36 342 A1 describes a mechanical solution for preventing the infringement of a maximum permissible speed for a vehicle with an engine whose power can be controlled by an accelerator pedal. This solution includes the action of a positioning motor on a control element which affects the power of the engine, in particular a throttle butterfly, in such a manner that the engine power is reduced irrespective of the accelerator-pedal position as soon as the driving speed exceeds the maximum speed. The positioning motor is controlled here by a controller which compares the actual speed with the maximum speed and influences the positioning motor to an extent dependent on the difference between these speeds if the driving speed rises to within the vicinity of the maximum speed.

A vehicle-speed controller described in German Patent document DE 41 15 903 A1 can also be used to automatically prevent the infringement of a specified maximum speed. Here, the regulating measure takes effect whenever the vehicle speed exceeds the maximum speed, and includes, for example, periodic interruption of the fuel supply, brake actuation and/or reduction of the throttle valve aperture. Here too, as in the case of the above-mentioned systems that limit the maximum speed, a system intervention is thus only envisaged when the vehicle speed has reached or exceeded the specified maximum speed.

An earlier filed German Patent Application P 44 34 022.2-32, commonly owned by the assignee of the present invention, which is not a prior publication, describes a method and an apparatus for limiting the speed of a motor vehicle to a specified maximum or minimum speed, in which a selective changeover is possible between the speed-limitation function and conventional cruise control. In order to avoid conflicts between the two modes of operation in a simple manner, separate operating speed ranges for speed limitation, on the one hand, and cruise control, on the other hand, are provided there. The primary idea here is to use cruise control in the usual manner above a minimum cruise-controller required speed of about 36 km/h and to use the speed-limitation function as a maximum-speed limitation below this speed value, e.g. as a 30 km/h limitation in residential areas. In the case of the speed limitation there, a speed-controlling system intervention takes place as a function of the actual speed in accordance with a predetermined control characteristic until the actual speed is within a predetermined window of the range of speeds to be kept to, while a speed-regulating intervention takes place when the actual speed is within a predetermined speed window containing the limiting speed.

German Patent document DE 35 10 174 A1 describes a cruise-control system for maintaining a predetermined required speed which includes a speed controller and an acceleration controller arranged in parallel with one another and by which it is possible to perform, in separate time segments, either an acceleration-regulating or a speed-regulating system intervention. The selection between these two control modes takes place at the request of the driver. If the driver wishes to change the required speed to be or limited by, he chooses, on an operating unit, a corresponding operating state in which the vehicle is accelerated subject to regulation. As soon as he wishes to end the acceleration and hence maintain a constant speed, he deselects this operating state again and, as a result, the control system switches to a speed-regulating system intervention.

German Patent document DE 36 18 844 A1 describes a method for limiting the speed of an internal combustion engine, in which, above a predetermined engine-speed threshold, the required value specified by the accelerator-pedal transmitter is limited in such a way that a maximum permissible rate of change of the engine speed is not exceeded. To this end, the maximum permissible rate of change of the engine speed is set by a PI controller above the engine-speed threshold. It is possible for the maximum permissible rate of change of the engine speed and the proportional and integral components of the controller to be specified as a function of the ratio of engine speed to travelling speed. This method can also be used to limit the travelling speed to a maximum vehicle speed, for which purpose the predetermined engine-speed threshold and/or the maximum permissible rate of change of the engine speed are determined such that a particular engine speed is not exceeded. The particular engine speed corresponds to a specifiable maximum vehicle speed. In each case, limitation takes the form of a system intervention which limits the angular acceleration such that, if the driver's request is above the specified maximum permissible angular acceleration, then the angular acceleration of the engine is regulated to this maximum permissible angular acceleration and hence limited. The maximum permissible angular acceleration here falls from a maximum value determined by the dynamic response of the engine to zero as the engine speed rises to the maximum engine speed.

The underlying technical problem of the invention is to provide a method and an apparatus for limiting the speed of a motor vehicle to an adjustable maximum speed, by which method and apparatus infringement of an arbitrarily adjustable maximum-speed value is reliably prevented, while still maintaining high driving comfort.

This problem is solved by a method for limiting the speed of a motor vehicle to an adjustable maximum speed, characterized by an acceleration-regulating system intervention with a required acceleration value, specified as a function of the difference between the maximum speed and the actual speed, when the difference between the set maximum speed and the actual speed is greater than a predetermined value and the actual acceleration reaches the required acceleration value, and further characterized by a speed-regulating system intervention when the difference between the maximum speed and the actual speed is less than the predetermined value and the speed demanded by the driver is above the maximum speed. The apparatus for solving the problems includes a unit which detects the position of an accelerator pedal, a limitation function module which contains, in parallel with one another, a speed controller, an acceleration controller and a changeover switch for the selective provision of the output signal of the speed controller or the acceleration controller as the limitation output signal, and a minimum selection unit to which can be fed the output signal of the unit which detects the pedal position and the output signal of the limitation function module. The output signal of the minimum selection unit determines the actuating signal for an element which determines the driving power.

According to the method of the present invention, an acceleration-regulating intervention takes place even below a speed value which switches over the mode of operation. This value is lower than the set maximum speed. The intervention takes place as a function of the difference between the set maximum speed and the actual speed in accordance with a predetermined required acceleration characteristic. When the speed value which switches over the mode of operation is exceeded, this value typically being not very far below the maximum speed, a switch-over is then made to a speed-regulating limitation mode with the set maximum speed as the required speed. By means of the acceleration-regulating system intervention provided here, which is not described in the above-mentioned earlier German Patent Application P 44 34 022.2-32 and which takes place significantly below the set maximum speed, a smooth approach of the actual speed to the maximum speed with a speed of approach very largely independent of the maximum speed and of the instantaneous engine load is achieved. This is true without the actual speed overshooting the maximum speed even in the case of relatively high set maximum speeds.

As a further significant characteristic of the method, no system intervention takes place while the speed demanded by the driver remains below the maximum speed, i.e. until the actual acceleration is above the acceleration value specified for the respective actual speed by the required acceleration characteristic. This ensures that, below the set maximum speed, the motor vehicle can be driven at any desired speed in accordance with the demands of the driver, without being influenced by the system. In contrast to conventional cruise control systems, the speed limitation method remains in readiness even when the driver brakes the vehicle from an actual speed above or equal to the maximum speed to a speed significantly below the actual speed. In the event of a subsequent attempt to accelerate, the limitation method then prevents a maximum-speed infringement, initially by the acceleration-regulating system intervention and then by the speed-regulating system intervention.

An advantageous apparatus is provided according to the present invention for carrying out the above method. For carrying out the acceleration-regulating and speed-regulating phases, an acceleration controller and a speed controller are provided in parallel, their output signals being fed to a change-over switch which can be driven by the speed error. The minimum selection unit on the output side ensures that speed adjustment takes place in accordance with the demands of the driver unless there is a risk that the set maximum speed will be exceeded. Only when this is the case, e.g. due to a demand from the driver for a high acceleration, does the minimum selection unit allow one of the controller output signals through instead of the accelerator-pedal signal as the actuating signal for a control element which determines the driving power, e.g. a throttle butterfly of an Otto engine or an injection-quantity control element of a diesel engine.

A further preferred embodiment of the present invention provides speed-controlling system interventions in certain special situations, so that even in these situations a gentle, jerk-free approach of the actual speed to the set maximum speed or, in the case where the limitation function has been switched off, to the speed demanded by the driver is achieved.

In order to reliably be able to keep to the set maximum speed in the limitation function even when travelling down grade, transmission downshifts are additionally provided as a advantageous further development of the present invention.

As a further preferred embodiment of the present invention, a permanent limitation function is provided in addition to the activatable and deactivatable limitation function with a maximum speed value that can be freely adjusted by the driver. This permanent limitation function remains active at all times during the journey and limits the speed to a maximum speed value which is set once, for example in the workshop, and which the vehicle is not to exceed at any time. A permanent limitation function of this type is appropriate, for example, when the vehicle is fitted with winter tires and should only be driven up to a maximum speed, determined by the tires, which is below the maximum speed that can be achieved by the vehicle. Another application is with vehicles which are used in countries with a legally stipulated speed limit.

As an advantageous embodiment of the invention, the apparatus which performs the method additionally has a cruise controller of conventional design in which either only cruise control or only the variable speed limitation is activated. If permanent maximum-speed limitation is provided, this remains active even when the cruise control has been activated. The required speed values which can be set for cruise control are limited to a range which maintains a predetermined distance from the permanent maximum-speed value in order to avoid conflicts between the permanent limitation function and the cruise control.

A preferred embodiment of the invention includes convenient, user-friendly operation by means of a single operating lever for the cruise-control function and the speed-limitation function with the possibility of setting maximum-speed values and of individual programming of a plurality of such values.

Other objects, advantages and novel features of the present invention will become apparent from the following detailed description of the invention when considered in conjunction with the accompanying drawings.

DETAILED DESCRIPTION OF THE DRAWINGS

The apparatus described below and the method carried out by it have the ability to limit the speed of a motor vehicle automatically to an adjustable maximum speed. The limitation includes engine-torque interventions and influencing of the transmission. In addition, the apparatus contains a cruise control of the customary type. The limitation device described is suitable, for example, for vehicles with a follow-up automatic transmission and an electronic engine-control system with an electronic accelerator-pedal function.

Figure 1:
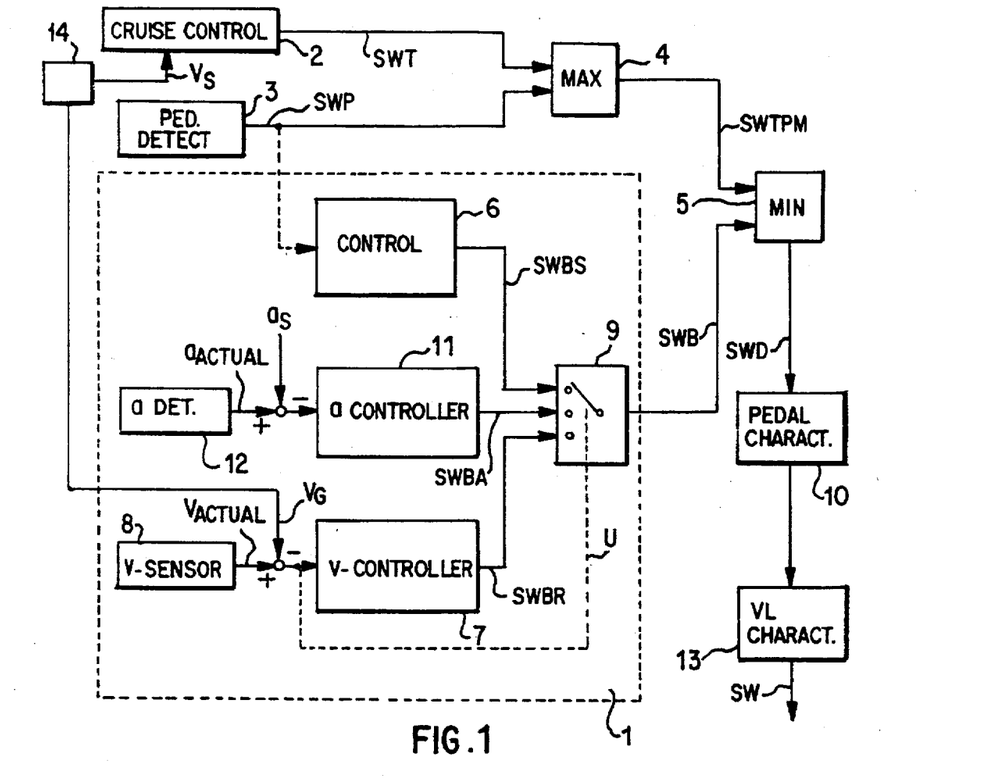
FIG. 1 is a block diagram of a functional component for engine-torque limitation within an apparatus for either cruise control or limitation of the vehicle speed to an adjustable maximum speed according to the invention.

In order to exercise the cruise-control and the limitation function, the apparatus has the engine-torque intervention component shown in FIG. 1, which is suitable for an Otto engine and has the following structure. A unit 3 for detecting the accelerator-pedal position generates a throttle-butterfly position signal (SWP) which represents the driver's demand for the engine torque. This signal (SWP) is fed in parallel with the output signal (SWT) of a cruise-control unit 2 to the input side of a maximum selection unit 4 which, of these signals, allows through the signal for the higher engine-torque demand as the output signal (SWTPM) to one input of a following minimum selection unit 5. The signal (SWP) of the unit 3 which detects the accelerator-pedal position is furthermore fed to a limitation control unit 6 within a limitation function module 1.

The limitation function module 1 carries out the actual limitation function and, for this purpose, has, in parallel with the limitation control unit 6, a speed controller 7 with an actual-speed sensor 8 connected to its input an acceleration controller 11 with an actual-acceleration determination unit 12 connected to its input and, on the output side, a changeover switch 9. From the signal (SWP) fed to it by the unit 3 which detects the accelerator-pedal position, the limitation control unit 6 identifies the engine torque demanded by the driver and emits an output control signal (SWBS) which is fed to a first terminal of the changeover switch 9. A subtraction stage on the input side of the speed controller 7 subtracts the maximum speed value ($v_c$) which can be set at an operating device 14, from the actual vehicle speed ($v_{actual}$) detected by the speed sensor 8 and feeds the speed error thus formed to the speed controller 7. In addition, this error signal serves as a control signal (U) for the changeover switch 9.

The speed controller 7 generates an output signal (SWBR) for the adjustment of the throttle butterfly. This signal is fed to a second selection terminal of the changeover switch 9. A subtraction stage on the input side of the acceleration controller 11 subtracts the required acceleration value ($a_s$) emitted by a unit (not shown specifically) from the actual acceleration value ($a_{actual}$) determined in the associated determination unit 12 and feeds the acceleration error thus formed to the acceleration controller 11. The latter generates an output signal (SWBA) which is dependent on the error signal and feeds it to a third selection terminal of the changeover switch 9. The required acceleration value ($a_s$) is here determined by the unit from the information fed to it on the difference between the set maximum speed ($v_G$) and the actual speed ($v_{actual}$) in accordance with the characteristic illustrated in FIG. 2, further details of which are given below.

A PD-$T_1$ controller is used both for the acceleration controller 11 and for the speed controller 7. The D component allows the acceleration controller 11 to respond rapidly to changes in acceleration influenced by the driver, e.g. owing to a return movement of the accelerator pedal. A suitable parameter set for the controllers 7, 11 is provided for each gear ratio. The changeover between the parameters after the detection of a gear-change is jerk-free, i.e. without a step change in the respective controller output signal.

Through the use of the changeover switch 9, one of the three input signals (SWBS, SWBR, SWBA) is allowed through as the output signal (SWB) of the limitation function module 1. This output signal is fed to a further input of the minimum selection unit 5. The latter allows through the signal (SWD) with the lower engine torque demand, i.e. the lower maximum throttle-butterfly opening angle demanded, to a pedal characteristic unit 10. Using an accelerator-pedal progression characteristic, the pedal characteristic unit 10 generates an actuating signal which is then passed via a full-load torque characteristic unit 13 for the throttle-butterfly opening angle as a function of the engine speed, which adapts the throttle-butterfly aperture to the engine torque, thereby generating the actuating signal (SW) for the throttle butterfly. With an otherwise identical apparatus construction, the pedal characteristic unit 10 in the case of vehicles with a diesel engine is positioned directly after the pedal detecting unit 3, and the full-load torque characteristic unit 13 is omitted. In the case of diesel engines, this results in the calculation of the limitation function taking place on the injection quantity level, i.e. the required-value quantities correspond to a respectively desired injection quantity, while, in the case of Otto engines, the limitation function is calculated on the accelerator-pedal level, i.e. the required-value quantities correspond to an imaginary accelerator-pedal position.

A proportional-action controller without an I component has, by its very structure, a permanent error, which is here load- or speed-dependent. Since this is unfavorable for the limitation mode, the working point of the speed controller 7 for a typical state on a journey is first of all adjusted in level for each gear ratio in such a way, by means of a pilot-control speed characteristic, that no error occurs precisely for this load state. In the case of the acceleration controller 11, however, additional engine torque is required for the acceleration process. For this purpose, the offset of the pilot-control speed characteristics is not sufficient to keep the acceleration controller 11 at the correct working point as well. For this purpose, additional pilot-control acceleration characteristics are provided for the acceleration controller 11. A separate characteristic is provided for each gear ratio as in the case of the pilot-control speed characteristics. This summing of additional pilot-control speed characteristics for the speed controller 7 or of additional pilot control speed and acceleration characteristics for the acceleration controller 11 is not shown explicitly in FIG. 1 to preserve clarity.

The mode of operation of the apparatus with the structure described above will be explained in detail below. The cruise-control device 2 operates in a conventional manner and it is thus sufficient to explain the limitation mode in greater detail.

A common operating lever is provided in the operating device 14 to set both the required speed value ($v_s$) for the cruise-control device 2 and the maximum speed ($v_G$) for the limitation function module 1. The operating lever is designed as a conventional cruise-control operating lever plus a switch for switching between cruise-control mode and limitation mode. The limitation functions "adjust maximum speed decrementally", "adjust maximum speed incrementally", "activate limitation function" and "switch off limitation function" correspond mutatis mutandis to the cruise-controller positions "set and decelerate", "set and accelerate", "re-engage" and "off". An operating device 14 of this kind, in which a single operating lever can be used to vary the setting of both the required speed value ($v_s$) for cruise control and the maximum speed ($v_G$) for the limitation function, is described in a commonly assigned, co-pending application U.S. Ser. No. 08/617,204, now allowed, filed on even date herewith and entitled "Apparatus for Regulating the Speed of a Motor Vehicle" corresponding to a German patent application of the applicant, which is not a prior publication, entitled "Apparatus for Regulating the Speed of a Motor Vehicle", to which reference may be made here for a detailed description of the operating device 14.

In addition to the functions already described there, there is the possibility in the case of the operating device (14) under consideration of programming a plurality of maximum-speed values by the operating lever by suitable actuation of the latter with the vehicle stationary. The programmed speed values can be called again in a cyclic sequence by an actuation of the operating lever. If, on the other hand, there is a setting request by means of the operating lever during the journey, the system assumes that a maximum speed in the region of the instantaneous actual speed is desired and consequently defines the latter or a setting close to it as the initial maximum speed value for the setting process, from which the maximum speed can be increased or reduced, in steps if required. The programmed maximum speed values are recalled cyclically by prolonged actuation of the operating lever in the functional position "activate limitation function", and the speed value displayed when the operating lever is released is taken as the current maximum speed value for a subsequent limitation phase.

While the speed demanded by the driver remains below the set maximum speed ($v_G$) an active limiting intervention is not required. On the other hand, an abrupt reduction in the engine power which did not occur until the time at which the actual speed ($v_{actual}$) exceeded the maximum speed ($v_G$) would be very uncomfortable, for which reason the limitation method performs active acceleration-regulating or speed-regulating limiting interventions while the actual speed values are still below the set maximum speed ($v_G$).

Figure 3:
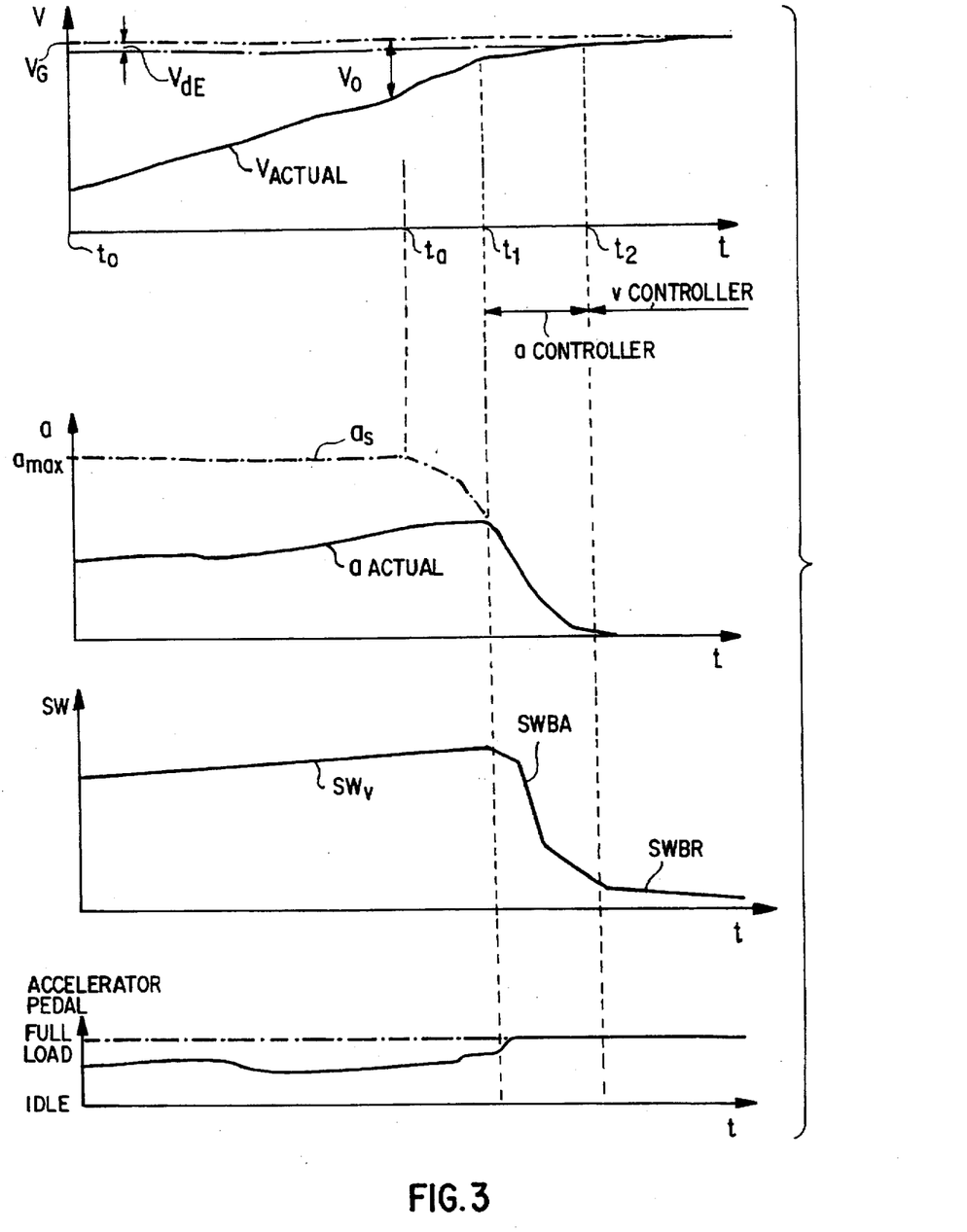
FIG. 3 is a graph of time-dependent curve diagrams of various variables during a typical speed-limitation phase.

With the limitation mode active, the limitation function module 1 operates, according to the situation, in a controlled mode, an acceleration-regulating mode or a speed-regulating mode, depending on whether the output signal of the control unit 6, that of the acceleration controller 11 or that of the speed controller 7 is allowed through by the changeover switch 9 as the output signal (SWB) of the limitation function module 1. FIG. 3 shows the case of an initial limitation-mode phase when the actual speed ($v_{actual}$) at the activation time ($t_o$) is significantly below the set maximum speed ($v_G$) and the driver demands a speed which is above the maximum speed ($v_G$) by depressing the accelerator pedal.

Initially, the vehicle accelerates with limitation of the actual acceleration ($a_{actual}$) by means of the limitation of the actuation signal (SW) for the throttle butterfly given by the full-load torque characteristic ($SW_v$). Because the difference between the set maximum speed ($v_G$) and the actual speed ($v_{actual}$) is still relatively large, the changeover switch 9, under the control of the corresponding speed error signal (U), allows through the output signal (SWBA) of the acceleration controller 11 as the output signal (SWB) of the limitation function module 1.

Figure 2:
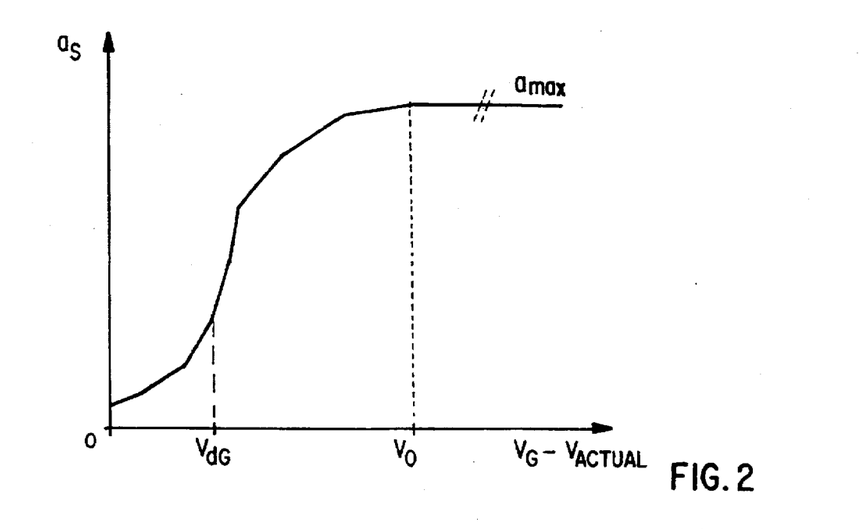
FIG. 2 is a graph of a characteristic of the required acceleration, specified as a function of the actual speed, for acceleration-regulating system interventions of the apparatus shown in FIG. 1.

The acceleration controller 11 regulates around a required acceleration value ($a_s$), which is plotted in dash-dotted lines in the topmost diagrams in all but one of the diagrams shown in FIG. 3 and is obtained from the associated characteristic in FIG. 2. As can be seen from FIG. 2, this required acceleration value ($a_s$) is the maximum acceleration value ($a_{max}$) for as long as the difference between the maximum speed ($v_G$) and the actual speed ($v_{actual}$) is above a predetermined value ($v_o$). If the difference between the maximum speed ($v_G$) and the actual speed ($v_{actual}$) falls below this predetermined value ($v_o$), the required acceleration value ($a_s$) is reduced steadily with the characteristic shown in FIG. 2 as the speed difference ($v_G$-$v_{actual}$) becomes smaller. In a corresponding manner, the required value ($a_s$) manner, the required value ($a_s$) of the acceleration controller in FIG. 3 begins to fall continuously from a time ($t_a$) at which the difference between the maximum speed ($v_G$) and the actual speed ($v_{actual}$) falls below the predetermined speed value ($v_o$), up to a later time ($t_1$). However, the required acceleration value ($a_s$) initially remains greater than the actual acceleration value ($a_{actual}$) so that although the acceleration controller 11 is already performing active regulation in the background, this does not initially have a noticeable effect on the vehicle behavior. From this time ($t_1$) onwards however, the minimum selection unit 5 ensures that the output signal (SWBA) of the acceleration controller 11 determines the throttle-butterfly actuating signal (SW). This consequently leads to a reduction in the actual acceleration ($a_{actual}$) and hence to a gentle approach of the actual speed ($v_{actual}$) to the set maximum speed ($v_G$)

As soon as, at a later time ($t_2$), the actual speed ($v_{actual}$) is just below the maximum speed ($v_G$) by a predetermined, relatively small speed value ($v_{dG}$), the changeover switch 9 is switched to the position in which it allows through the output signal (SWBR) of the speed controller 7 as the output signal (SWB) of the limitation function module 1. In this way, a switch is made from the acceleration-regulating to the speed-regulating limitation mode, and the output signal (SWBR) of the speed controller 7 from now on determines the throttle-butterfly actuating signal (SW). The parameters of the differential equation of the speed controller 7 are initialized in such a way that this changeover operation from acceleration-regulating to speed-regulating takes place in a jerk-free manner in that the controller output variables both before and after the changeover time are equal in magnitude. After this, the further adjustment of the actual speed ($v_{actual}$) to the set maximum speed ($v_G$) takes place with the speed controller 7 operating freely.

From the diagram at the bottom of FIG. 3, it can be seen that reliable limitation of the actual speed ($v_{actual}$) to the maximum speed ($v_G$) is achieved by means of the acceleration-regulating phase and the subsequent speed-regulating phase even though the driver has depressed the accelerator pedal down to full load after perceiving the reduction in acceleration at the onset of the acceleration-regulating phase, as the diagram at the bottom of FIG. 3 shows. The speed-regulating system intervention is then maintained until either the limitation function is deactivated or the actual speed ($v_{actual}$) has reached a predetermined value below the set maximum speed ($v_G$) by virtue of a deceleration demanded by the driver, after which a changeover is made back to the acceleration-regulating system intervention. To ensure that the system is not continuously switching over between the two types of regulation when the vehicle is driving in the region of these changeover thresholds, the speed value chosen for the changeover from speed regulation to acceleration regulation is smaller than that for the changeover from acceleration-regulating to speed-regulating mode.

Figure 4:
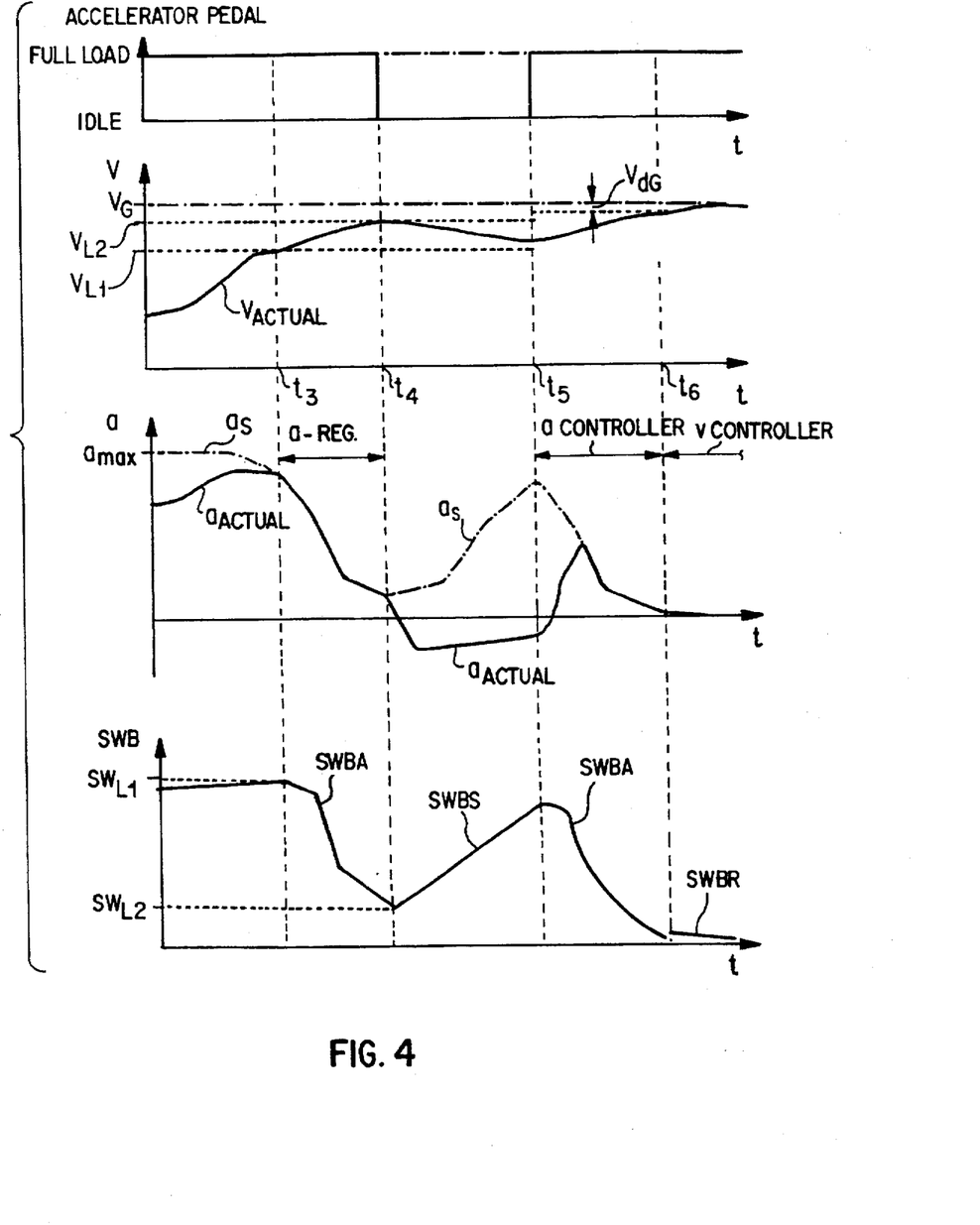
FIG. 4 is a graph of time-dependent curve diagrams of various variables during a speed-limitation phase with a brief deceleration phase demanded by the driver.

FIG. 4 illustrates the beginning of a speed limiting phase in which the driver decelerates in-between times, releasing the previously depressed accelerator pedal at a time ($t_4$) up to a time ($t_5$), after which he depresses it again, as can be seen in the topmost diagram in FIG. 4. Initially, the driving performance is similar to that in FIG. 3 in that, due to the depression of the accelerator pedal, the actual acceleration ($a_{actual}$) rises, with limitation by the full-load torque characteristic, until, at a time ($t_3$), it reaches the required acceleration value ($a_s$). At this time ($t_3$), the actual speed ($v_{L1}$) at that time and the associated instantaneous throttle-butterfly actuating signal ($SW_{L1}$) are stored. If, as in the case illustrated, the actual vehicle acceleration ($a_{actual}$) now becomes smaller again than the required acceleration value ($a_s$) of the acceleration controller 11 during the subsequent acceleration-regulating phase because of the return movement of the accelerator pedal at time ($t_4$), the actual speed ($v_{L2}$) at that time and the associated throttle-butterfly actuating signal ($SW_{L2}$) are again stored, and a speed-controlling system intervention is then performed.

In this speed-controlling phase, in which the limitation control unit 6 is active, linear interpolation is performed between the two stored throttle-butterfly actuating signal values ($SW_{L1}$, $SW_{L2}$) as a function of the two associated thereout actual-speed values ($v_{L1}$, $v_{L2}$) while the actual speed ($v_{actual}$) is still above the first stored speed ($v_{L1}$). The differential equation of the acceleration controller 11 is initialized cyclically in parallel with this in such a way that the output of the acceleration controller always corresponds to the interpolated throttle-butterfly actuating signal. When, after the brief throttle release, the driver fully depresses the accelerator pedal again at a time ($t_5$), an acceleration-regulating limitation phase with the correct required acceleration value begins immediately. This measure prevents the required acceleration value ($a_s$) from permitting maximum engine torque during this period, a torque which would first of all have to be reduced by the controller time constant, with the result that infringement of the maximum speed could occur. This adaptation measure consequently prevents a situation where the vehicle is accelerated with too much engine torque when the accelerator pedal is depressed again after a brief deceleration and, as a result, the actual speed exceeds the maximum speed. AS described above in connection with FIG. 3, once the predetermined difference ($v_{dG}$) between the actual speed ($v_{actual}$) and the maximum speed ($v_G$) is reached, a changeover is made again, at a subsequent time ($t_6$), from acceleration regulation to speed regulation.

In certain driving situations, e.g. when driving down slopes, reducing the engine torque may not be sufficient to prevent the actual speed ($v_{actual}$) from overshooting the maximum speed ($v_G$). Transmission control interventions are therefore provided in addition. On the one hand, a transmission upshift, just before the maximum speed ($v_G$) is reached by the actual speed ($v_{actual}$), is suppressed, so that the vehicle does not push beyond the maximum speed ($v_G$) due to the torque jump associated with the shift operation. In the case of low set maximum speeds, there is furthermore provision for driveaway in second gear if required since, in the case of full engine torque in first gear, it might otherwise no longer be possible to reduce the actual acceleration by the time the maximum speed ($v_G$) was reached. As a third transmission intervention measure, transmission downshifts are carried out, as explained in greater detail below with reference to FIG. 5 for the case of an acceleration-regulating phase in the limitation mode.

Figure 5:
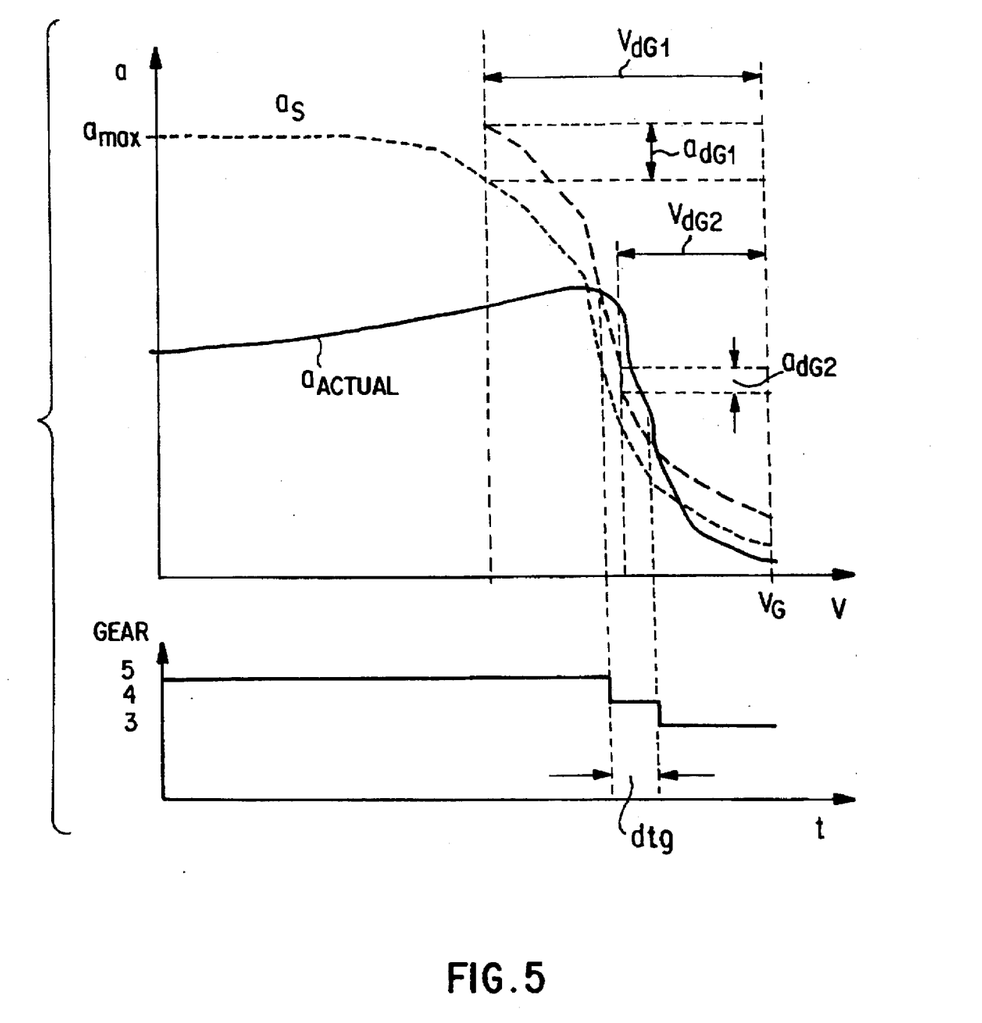
FIG. 5 is a graph of curve diagrams of the vehicle acceleration as a function of the actual speed and of the respective gear position as a function of time to illustrate a speed-limitation phase which includes transmission downshifts.

In the top diagram of FIG. 5, the relevant actual acceleration ($a_{actual}$) and the required acceleration ($a_s$) of the acceleration controller 11, which is active at least in the background, are shown respectively as a solid characteristic and a thin broken-lined characteristic as a function of the actual speed ($v_{actual}$). At the beginning of the acceleration-regulating phase, the actual acceleration ($a_{actual}$) rises, while the required acceleration ($a_s$) falls slowly from its horizontal course at the maximum acceleration ($a_{max}$), as described with reference to FIGS. 3 and 4.

In the case of FIG. 5, the acceleration controller 11 on its own is not able, as in the preceding cases, to keep the actual acceleration ($a_{actual}$) to the required-acceleration characteristic after it has reached the required acceleration ($a_s$). On the contrary, the actual acceleration ($a_{actual}$) overshoots the required acceleration ($a_s$). In this case, as soon as the distance between the actual speed ($v_{actual}$) and the set maximum speed ($v_G$) is below a predetermined value ($v_{dG1}$), and the difference between the actual acceleration ($a_{actual}$) and the required acceleration ($a_s$) exceeds a predetermined acceleration value ($a_{dG1}$), which is represented by the left-hand half of the thick broken-lined characteristic above the required-acceleration characteristic, i.e. when the actual-acceleration characteristic first intercepts the thick broken-lined characteristic, a first transmission downshift is performed. This is illustrated in the contemporaneous gear-ratio diagram situated underneath it in FIG. 5. After such a downshift, a predetermined waiting time ($d_{tg}$) is first of all allowed to expire. The system then enquires in a similar manner whether, on the one hand, the distance between the actual speed ($v_{actual}$) and the maximum speed ($v_G$) is below another predetermined limiting distance ($v_{dG2}$) and whether, on the other hand, the actual acceleration ($a_{actual}$) is at a distance above the required acceleration ($a_s$) corresponding to another predetermined acceleration distance ($a_{dG2}$), which is represented by the right-hand part of the heavy broken-lined characteristic above the required acceleration characteristic. If this is the case, as shown in FIG. 5, a second transmission downshift, in this case from fourth to third gear, is performed. Another precondition for both transmission downshifts is that the output signal (SWBA) of the acceleration controller (11) should in each case already be zero.

Transmission downshifts can also be performed during speed-regulating phases of the limitation mode to increase the engine-braking torque, in order to reach the desired maximum speed ($v_G$) again as far as possible without a braking intervention by the driver when the actual speed ($v_{actual}$) rises beyond the maximum speed ($v_G$) due to the fact that the vehicle is driving down a slope. Up to two transmission downshifts are brought about in this case, although a downshift into first gear is not permitted. The decision as to whether the transmission is to be shifted down by one or two gears is taken with the aid of the difference between two acceleration values, which are determined at two speed thresholds. One of the acceleration values is chosen when the speed-controller output signal has fallen to zero and the other is set at a predetermined value above this first threshold. The acceleration difference detected is a measure of the steepness of the downward slope. When the difference is between zero and a predetermined limiting value, the transmission is immediately shifted down by one gear. If the actual speed ($v_{actual}$) continues to increase, the transmission is shifted down by another gear when the actual speed is above the set maximum speed by a predetermined value. If the acceleration difference is less than zero, this is recognized as a decreasing gradient and a first downshift is then only performed if the actual speed is above the maximum speed by an associated value. If the above-mentioned speed value for a second downshift is reached in this case as well, a second downshift is subsequently performed in addition. If the acceleration difference is above the predetermined limiting value, a downshift by two gears is immediately performed. The respective downshift is only cancelled when the vehicle is on the flat again or on an upward slope. Pilot-control speed characteristics of a conventional type, with which the speed-controller output signal is compared, are used as the decision criterion for this purpose.

In addition to the transmission downshifts, the limitation apparatus also performs further functions not shown explicitly in the figures. Mention may be made here, for example, in the case of Otto engines, of an overrun-jerk prevention function which has the aim familiar from cruise control of moving the engagement and disengagement thresholds of the overrun cut-off sufficiently far apart to prevent the occurrence of troublesome overrun jerking. For the speed-limiting mode, a permanent speed hysteresis such as that for overrun cutoff in the case of the cruise controller is not appropriate since the braking effect of this on relatively steep downward slopes is very desirable and should take effect even in the case of small speed deviations. To this end, the initiation of a first overrun cut-off after the value zero is reached by the speed-controller output signal is followed by the initiation of a second overrun cut-off after the speed-controller output signal reaches the value zero again. This second overrun cut-off is initiated with a delay and only when the actual speed is above the actual speed upon initiation of the first overrun cut-off by a predetermined value. By means of this overrun cut-off hysteresis that can be varied as a function of speed, a reliable overrun-jerk prevention function is achieved irrespective of the respectively set maximum-speed value.

A further characteristic of the limitation apparatus is the ability to change the maximum speed while the limitation mode is active, appropriate measures being used to ensure that uncomfortable acceleration jerks are avoided. When the maximum speed is changed to higher values, the apparatus switches over to the acceleration controller 11 if the speed controller 7 has already been active. Previous transmission control interventions are reversed if their associated conditions are no longer met in the case of the new maximum speed. To ensure that the vehicle does not suddenly accelerate due to the increase in the required acceleration value caused by the increase in the maximum speed, a speed controlling system intervention is performed once again with the aid of the control unit 6 before the actual acceleration phase. Through this system intervention, the output actuating signal (SWB) of the limitation function module (1) is altered uniformly by a time-dependent characteristic. As soon as the output signal (SWBS) of the, until then, active control unit 6 reaches the value of the acceleration-controller output signal (SWBA), the changeover switch 9 switches from the control unit 6 to the acceleration controller 11, after which the actual limitation mode occurs. Similarly, when setting a lower maximum speed, a changeover is made to the speed controller 7 if the acceleration controller 11 has previously been active. Since, owing to the new system error which arises, the speed-controller output signal (SWBR) rapidly reaches zero, but abrupt changes in engine torque are uncomfortable, the output signal value (SWB) of the limitation function module 1 which was present before the maximum speed was lowered is reduced to zero using a ramp with a selectable slope by the control unit 6, which is active in the intervening period. Suitable transmission downshifts can be used to assist the achievement of the new, lower maximum speed, if required.

The process is similar to that in the case of the above-described setting of a lower maximum speed while the limitation mode is active, when the limitation function is activated in the case where the actual speed is above the set maximum speed. A further important function of the limiting apparatus is formed by the transient function following the switching off of the limitation function by the actuation of the changeover switch between limitation mode and cruise-control mode or by the actuation of the operating lever into the "off" position. When the limitation function is switched off, the output signal (SWB) of the limitation function module 1, which has up to this point generally been provided by one of the two controllers 7, 11, is brought back smoothly by a controlling intervention of the control unit 6 from the value current at the switch-off time to the value (SWP) currently desired by the driver. This valve is fed, for this purpose, to the input of the control unit 6. A time-dependent required-value characteristic for the output signal (SWBS) of the control unit 6 which passes through zero and, for example, takes the form of a rising parabola is specified here, and this characteristic is in each case followed from the point on the characteristic which corresponds to the limitation output signal (SWB) at the switch-off time. When required, the slope of the characteristic can also be chosen as a function of the accelerator-pedal position. Through the use of these measures, an adaptation of the transition control after the limitation mode is switched off to the instantaneous load conditions is achieved, thereby making it possible to bring the actual speed as rapidly and smoothly as possible to the speed demanded by the driver. If a transmission control intervention was present at the switch-off time, this is only cancelled once the vehicle leaves the downward slope and is on the flat, thus preventing cancellations of transmission downshift requests which are not optimum or even critical to safety when the limitation function is switched off while the vehicle is travelling on a downward slope.

If there is a "kick-down switch", the limitation function is also switched off when the latter is actuated as soon as the difference between the maximum speed and the actual speed falls below a predetermined value. This is intended to ensure that the increase in the engine torque desired by the driver can be achieved and is not suppressed by the limitation function. Depending on the engine-load and speed conditions, the kick-down function is supported by transmission shifts.

The limiting apparatus is furthermore additionally provided, in a manner not shown, with a permanent maximum-speed limitation function in addition to the possibility of setting a variable maximum speed. The permanent maximum-speed limitation function is continuously active. The associated maximum-speed value which the vehicle must not exceed at any time is set, for example, by a diagnostic unit in a workshop. This value can be a maximum speed determined by winter tires that have been fitted or a general national speed limit below the maximum speed which can be achieved by the vehicle. The permanent maximum speed is displayed to the driver when the ignition is switched on before the engine is started, or when the actual speed approaches this permanent maximum speed. The permanent limitation function remains active even when the cruise-control mode is active. In order to avoid control conflicts between these modes of operation, the permissible maximum required speed of the cruise controller is limited to a range which ensures a sufficient distance from the permanent maximum speed. In the event of transmission control interventions, the permanent limitation function furthermore has priority. With the fixed maximum-speed value, the permanent limitation function acts in a manner similar to the variable limitation function described. Conflicts between the permanent limitation function and the variable limitation function are prevented by the fact that the permanent limitation function acts only when the variable limitation function has not been activated.

With the apparatus shown it is consequently possible to carry out speed limitation with a variable maximum speed in addition to conventional cruise control while at the same time ensuring a high level of driving comfort and convenience of operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for limiting a speed of a motor vehicle to an adjustable maximum speed ($v_G$), the method comprising the steps of:

performing an acceleration-regulating system intervention on the motor vehicle with a required acceleration value ($a_s$), specified as a function of a difference between the maximum speed ($v_G$) and an actual speed ($v_{actual}$), when said difference is greater than a predetermined value ($v_{dG}$) and an actual acceleration reaches the required acceleration value ($a_s$); and performing a speed-regulating system intervention on the motor vehicle when said difference between the maximum speed ($v_G$) and the actual speed ($v_{actual}$) is less than said predetermined value ($v_{dG}$) and a speed demanded by a driver is above the maximum speed ($v_G$).

2. The method according to claim 1, wherein said acceleration-regulating system intervention performing step takes place whenever one of the following occurs:

a previously active limitation-mode phase ends;

a limitation mode is activated in a case where the actual speed ($v_{actual}$) is greater than the maximum speed ($v_G$);

the maximum speed ($v_G$) is altered with the limitation mode switched on; and the actual speed ($v_{actual}$) falls at a request from the driver during an acceleration-regulating phase.

3. The method according to claim 1, further comprising the step of performing a transmission downshift on the motor vehicle if, during an acceleration-regulating phase, the actual acceleration ($a_{actual}$) rises above the required acceleration ($a_s$) by a predetermined value ($a_{dG1}$, $a_{dG2}$), or if, during a speed-regulating phase, the actual speed ($v_{actual}$) remains above the maximum speed ($v_G$) for longer than a predetermined time period.

4. The method according to claim 2, further comprising the step of performing a transmission downshift on the motor vehicle if, during an acceleration-regulating phase, the actual acceleration ($a_{actual}$) rises above the required acceleration ($a_s$) by a predetermined value ($a_{dG1}$, $a_{dG2}$), or if, during a speed-regulating phase, the actual speed ($v_{actual}$) remains above the maximum speed ($v_G$) for longer than a predetermined time period.

5. The method according to claim 1, further comprising the step of permanently setting a further maximum speed for an associated further speed limitation on the motor vehicle, said further maximum speed being set to a value which must not be exceeded by the motor vehicle at any time.

6. The method according to claim 2, further comprising the step of permanently setting a further maximum speed for an associated further speed limitation on the motor vehicle, said further maximum speed being set to a value which must not be exceeded by the motor vehicle at any time.

7. The method according to claim 3, further comprising the step of permanently setting a further maximum speed for an associated further speed limitation on the motor vehicle, said further maximum speed being set to a value which must not be exceeded by the motor vehicle at any time.

8. The method according to claim 4, further comprising the step of permanently setting a further maximum speed for an associated further speed limitation on the motor vehicle, said further maximum speed being set to a value which must not be exceeded by the motor vehicle at any time.

9. An apparatus for limiting a speed of a motor vehicle to an adjustable maximum speed ($v_G$), the apparatus comprising:

an accelerator pedal position detector having a pedal position output signal (SWP);

a limitation function module comprising a speed controller and an acceleration controller arranged in parallel with one another as well as a changeover switch for selectively providing either an output signal of the speed controller or the acceleration controller as a limitation output signal (SWB) from the limitation function module;

a minimum selection unit which receives as its inputs the output signal (SWP) from the accelerator pedal position detector and the limitation output signal (SWB) from the limitation function module; and wherein the minimum selection unit outputs a selection output signal (SWD) which determines an actuating signal for an element determining a driving power for the motor vehicle.

10. The apparatus according to claim 9, further comprising:
- a cruise-control speed-regulating unit having a cruise-controller output signal (SWT);
- a maximum selection unit which receives as inputs the cruise-controller output signal (SWT) from said cruise-control speed-regulating unit and the accelerator pedal position detector output signal (SWP) from the accelerator pedal position detector; and
- wherein a maximum selection output signal (SWTPM) from the maximum selection unit is fed to the minimum selection unit in addition to the limitation output signal (SWB).

11. The apparatus according to claim 10, further comprising:
- an operating device having a switch for switching between a cruise-control mode and a speed-limitation mode, said operating device further having a common operating lever for setting both a cruise-controller required-speed value and a maximum speed for the limitation function module.

12. The apparatus according to claim 11, wherein a plurality of maximum-speed values are stored in a memory for later recall through the use of the operating lever.

\* \* \* \* \*